United States Patent Office 3,276,843
Patented Oct. 4, 1966

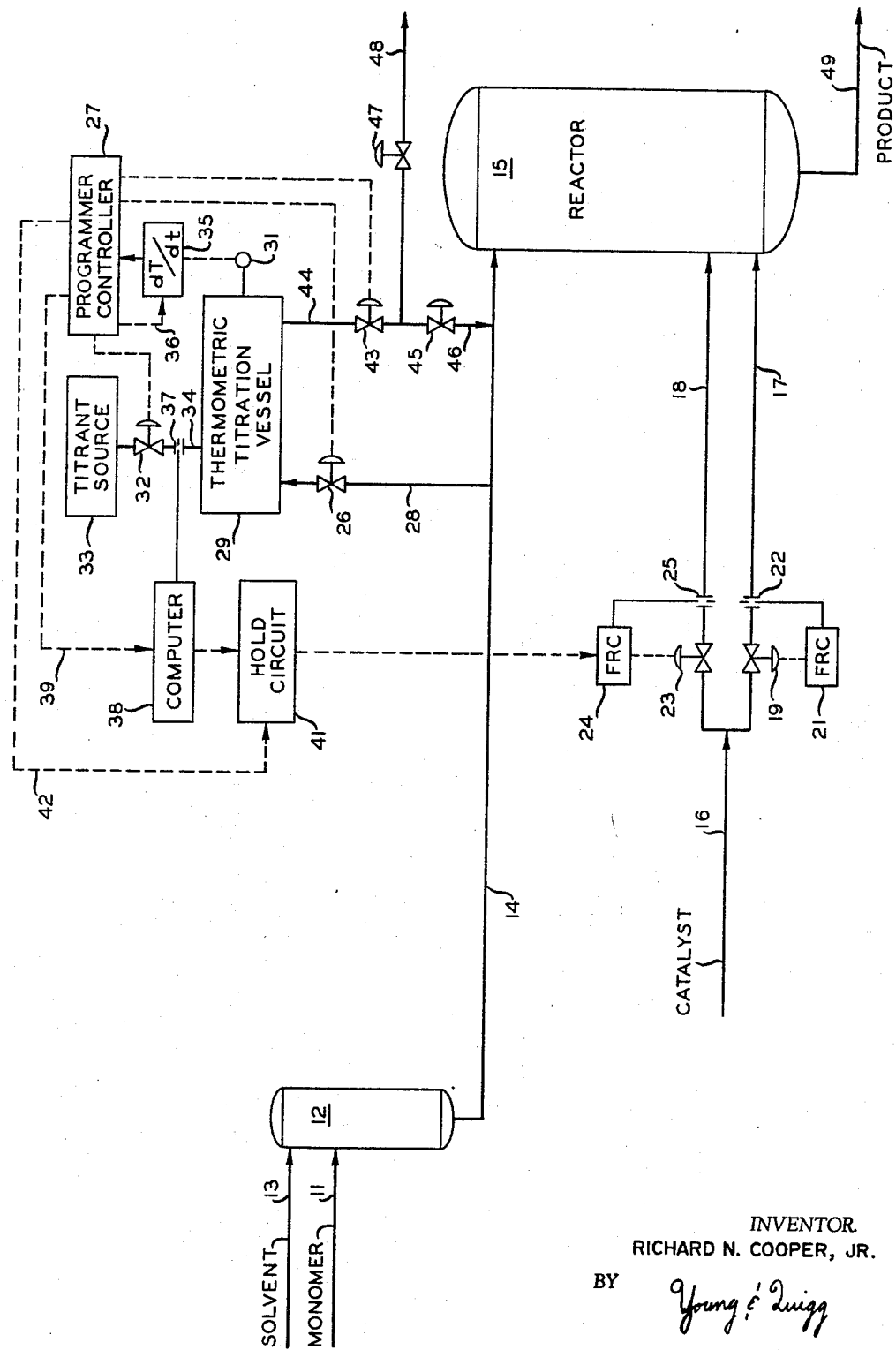

3,276,843
THERMOMETRIC ANALYSIS METHOD AND APPARATUS FOR CONTROL OF CATALYTIC REACTIONS
Richard N. Cooper, Jr., Borger, Tex., assignor to Phillips Petroleum Company, a corporation of Delaware
Filed Feb. 27, 1963, Ser. No. 261,449
10 Claims. (Cl. 23—230)

This invention relates to method and apparatus for controlling a process. In one aspect the invention relates to method and apparatus for controlling the rate of addition of catalyst into a reaction system. In another aspect the invention relates to method and apparatus for maintaining a desired concentration of active catalyst in a reaction zone regardless of variations in the concentration of catalyst poisons. In a further aspect the invention relates to the utilization of an automatic titration system to intermittently and repetitively determine the concentration of catalyst poisons in a reaction feed stream and to intermittently manipulate the continuous rate of addition of catalyst to the reaction responsive to such determination.

Variations in the concentration of catalyst poisons in a feed stream to a reaction zone lead to difficulties in process control and in control of the properties of the reaction products. For example, in the solution polymerization of butadiene to form cis-polybutadiene, variations in the level of catalyst poisons in the feed streams affect the rate of the polymerization reaction and the Mooney viscosity of the polymer product. The amount of catalyst required to produce a reaction product having certain desired properties at the desired rate of reaction can be defined as the sum of a "constant increment" and a "variable increment." The "variable increment" is the amount of catalyst required to bring the feed stream to the "threshold" level of reaction, that is, the amount required to destroy or neutralize the catalyst poisons contained in the feed stream. The "constant increment" is the amount of catalyst required to produce the desired rate of reaction and the desired properties of the final product in the absence of any catalyst poisons. The value of the "constant increment" required for different values of the desired property of the product can be predetermined by laboratory tests utilizing feed materials substantially free of catalyst poisons. Thus the desired value of the "constant increment" can be readily determined and the corresponding amount of catalyst introduced into the reaction zone. On the other hand, a determination of the "variable increment" from an examination of the properties of the product is unsuitable for control purposes because of the variations in the level of catalyst poisons during the time it takes for a given variation in catalyst poison level to show up in the properties of the product and be analyzed. As a result, in commercial processes the physical properties of the product and reaction rates in the process vary undesirably as the level of catalyst poisons in the feed materials varies.

In accordance with the invention there is provided apparatus and method for the introduction into a reaction zone in which an exothermic reaction occurs of the amount of catalyst necessary to obtain desired properties of the product and desired reaction rate comprising passing a feed stream into said reaction zone, intermittently and repetitively withdrawing a sample from said feed stream, passing the thus withdrawn sample into a thermometric titration zone, introducing into said sample in said thermometric titration zone a catalytic material which reacts with catalyst poisons contained in said sample, detecting the sharp rise in temperature of the titrated sample which signifies the substantially complete reaction of the catalyst poisons contained therein and the commencement of the primary exothermic reaction, establishing a control signal responsive to the amount of said material added to said sample prior to the detection of said sharp temperature rise, and introducing catalyst into said reaction zone at a rate responsive to said control signal. The primary reaction of the process can be any exothermic catalytic reaction, for example, polymerization, hydrogenation or alkylation.

Accordingly it is an object of the invention to provide an improved system for controlling the addition of catalyst to an exothermic catalytic reaction. Another object of the invention is to provide an accurate method and means for determining the level of catalyst poisons in the feed materials to a reaction and for controlling the rate of addition of catalyst to the reaction responsive to such determination. Another object of the invention is to provide method and means for maintaining the properties of a catalytic reaction product at desired values. Yet another object of the invention is to provide improved means and method for controlling the rate of reaction in a catalytic reaction. A still further object of the invention is to provide simple and inexpensive means for rapidly and accurately controlling the rate of addition of catalyst to a reaction.

Other objects, aspects, and advantages of the invention will be apparent from a study of the disclosure, the drawing and the appended claims to the invention.

Referring now to the drawing there is shown a schematic representation of a polymerization process incorporating one embodiment of the invention. While the invention is applicable to any exothermic catalytic reaction wherein the feed materials contain catalyst poisons, for purpose of illustration the invention will be described in terms of the production of polybutadiene. 1,3-butadiene from a suitable source thereof is passed through conduit 11 into mixing means 12 while a suitable solvent, for example, hexane, is passed from a suitable source through conduit 13 into mixing means 12. Mixing means 12 can be of any suitable design known to those skilled in the art, for example, a multiorifice mixer. The resulting admixture is withdrawn from mixing means 12 and passed through conduit 14 into reactor 15. Reactor 15 can be any suitable type known in the art and can comprise a single reactor or a plurality of reactors either in series or in parallel or both. Batchwise or continuous operation can be utilized in reactor 15. A suitable catalyst, for example n-butyllithium, is passed from a suitable source thereof through main conduit 16 and branch conduits 17 and 18 into reactor 15. The rate of flow of the catalyst through branch conduit 17 is regulated by valve 19, which is manipulated by flow rate recorder controller 21 responsive to a comparison of a set point value and the rate of flow through conduit 17 as indicated by the differential pressure across an orifice 22, located in conduit 17. The set point signal to controller 21 is representative of the "constant increment" value which has been predetermined. Thus the flow of catalyst through branch conduit 17 is the amount required to obtain the desired reaction rate and product properties, assuming no catalyst poisons in the feed streams to the reactor 15. The rate of flow of the catalyst through branch conduit 18 is regulated by valve 23, which is manipulated by flow rate recorder controller 24 responsive to a comparison of a set point value and a signal which is a function of the differential pressure across an orifice 25, located in conduit 18. While the flow sensors have been described in terms of orifices 22 and 25, any suitable flow detector-transmitter can be utilized. The set point signal to controller 24 is representative of the "variable increment" which is determined in a manner hereinafter described. Thus the flow of catalyst through branch conduit 18 is the amount required to neutralize the catalyst poisons contained in the feed streams to reactor 15 and thus bring the feed material up to the "threshold level" of chemical reaction.

Valve 26 is actuated by programmer-controller 27 to intermittently and repetitively withdraw a sample of the blended feed materials from conduit 14 and pass the thus withdrawn sample through conduit 28 into titration vessel 29. Valve 26 is preferably a valve which is adapted to pass a sample of predetermined volume into vessel 29. However, it is within the contemplation of the invention to utilize any suitable means for passing a predetermined volume or otherwise measured amount of sample into vessel 29. After the introduction of the sample into vessel 29, valve 32 is actuated by programmer-controller 27 to pass a suitable titrating material from a source 33 thereof through conduit 34 into titration vessel 29. The titrating material is a catalytic material which reacts with the catalyst poisons and then initiates the primary exothermic reaction. Valve 32 can be alternated between the fully closed and the fully open position during each complete cycle of the repetitive batch titration, or can be adjusted to be properly sized to produce the desired rate of flow of titration agent to vessel 29. Suitable titrating materials include organolithium compounds such as those included in the general formula $R(Li)_x$, where R is a hydrocarbon radical selected from the group consisting of aliphatic, cycloaliphatic, and aromatic radicals and $x$ is an integer from 1 to 4, inclusive. The aliphatic and cycloaliphatic radicals can be saturated or contain olefinic unsaturation. The R in the formula has a valence equal to the integer and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyl-lithium, dilithiostilbene, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10 - dilithio-9, 10-dihydroanthracene, 1,2-dilithio-1,8-diphenyloctane, 1,3,5 - trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10, 20-tetralithioeicosane, 1,2,4,6-tetralithiocyclohexane, 1,2, 3,5 - tetralithio-4-hexylanthracene, 1,3-dilithio-4-cyclohexane, and the like.

It is presently preferred that the titrating material be the same as the primary catalyst which is being employed in reactor 15 as this eliminates any requirement of converting the amount of titrating material required to neutralize the sample into the equivalent amount of the primary reaction catalyst. However, it is within the contemplation of the invention to utilize different materials for the titrating material and the primary catalyst.

The titrating material is passed through conduit 34 into vessel 29 until all catalyst poisons have been neutralized and the primary exothermic reaction begins. The beginning of the primary exothermic reaction is evidenced by a sharp rise in the temperature of the sample in vessel 29. A temperature sensing device 31, for example, a thermistor, is located in vessel 29 in heat transferring relationship with the sample in vessel 29. The output of sensing device 31 is applied to an input of a differentiator 35 which produces an output signal representative of $dT/dt$, that is, the rate of change of the temperature of the sample in vessel 29 with respect to time. A control signal can be transmitted from programmer-controller 27 along line 36 to deactuate differentiator 35 during the draining of a sample from vessel 29 and the introduction of the subsequent sample, thereby eliminating the possibility of an erroneous signal being produced during such interval. The output of differentiator 35 is applied to an input of programmer-controller 27.

A signal representative of the differential pressure across an orifice 37 located in conduit 34 is transmitted to an input of computer 38. Computer 38 produces an output signal representative of $K\int Fdt$, where F is the instantaneous rate of flow of titrating material through conduit 34, K is a proportionality factor and $t$ is time. Computer 38 is reset to zero by a signal transmitted from programmer-controller 27 along line 39 prior to the commencement of the addition of the titrating material to the sample in each cycle of operation. The output of computer 38 at any given moment is thus representative of the amount of titrating material added to the sample up to that point during the cycle and is applied to an input of hold circuit 41. Hold circuit 41 can be any suitable means known in the art, for example two capacitors which are alternately switched between the output of computer 38 and the output of hold circuit 41. A signal can be transmitted from programmer-controller 27 along line 42 to actuate appropriate switching means to connect one of the capacitors to the output of computer 38 and to connect the other capacitor to the output of hold circuit 41. The capacitor connected to the output of computer 38 can be discharged by the reset signal transmitted on line 39, thereby preparing the capacitor and the computer for the next cycle. The output of hold circuit 41 is representative of the "variable increment" and is applied to the set point input of flow rate recorder controller 24. While computer 38 and hold circuit 41 have been described as separate elements, it is within the contemplation of the invention to utilize a combined system, for example a system such as the one disclosed by D. A. Fluegel and L. R. Freeman in "Simulating Sampled Data Control," Control Engineering, volume 9, pages 123–125, June 1962.

The sharp increase in the output of differentiator 35 corresponding to the titration end point is utilized by programmer-controller 27 as the initiating signal to actuate valve 32 to a closed position and to transmit the switching signal along line 42 to hold circuit 41. At a preselected time subsequent thereto programmer-controller 27 transmits a reset signal along line 39 to reset computer 38 and the capacitor in hold circuit 41 which is connected to the output of computer 38. Programmer-controller 27 also actuates valve 43 in drain conduit 44 to remove the treated sample from vessel 29. If desired, valve 45 can be actuated to an open position to pass the treated sample through conduit 46 into feed conduit 14, or valve 47 can be actuated to an open position to permit the passage of the treated sample through conduit 48 to a point of disposal, recovery, or treatment. The reaction product comprising polymer, monomer, and solvent can be withdrawn from reactor 15 by way of conduit 49 and passed to a recovery system, as is known in the art.

While the catalyst introduction system has been described in terms of branch conduits 17 and 18, valves 19 and 23, and controllers 21 and 24, it is within the contemplation of the invention to utilize a single conduit and associated valve and controller with the set point on the controller being representative of the summation of the "constant increment" set point value of controller 21 and the "variable increment" set point value of controller 24.

While the invention has been described in terms of the solution polymerization of butadiene, the invention is broadly applicable to the polymerization of olefins containing 2 to 12 carbon atoms per molecule, preferably 2–8 carbons per molecule, and especially conjugated dienes of 4 to 8 carbon atoms per molecule such as 1,3-butadiene, isoprene, 2,3-dimethylbutadiene, 2-methoxy-1,3-hexadiene, 1,3-octadiene, and the like. These conjugated dienes can be polymerized either alone or in admixture with each other and/or with one or more compounds containing an active vinylidene group, $CH_2=C<$, which are copolymerizable with the conjugated dienes. Such comonomers representatively include vinyl-substituted aromatic compounds, such as styrene, 3-methylstyrene, 1-vinylnaphthalene, and the like; vinyl halides such as vinyl chloride, vinyl bromide, vinylidene chloride, and the like;

esters of acrylic acid and esters of homologues of acrylic acid, such as methyl acrylate, ethyl acrylate, methyl methacrylate, ethyl ethacrylate, methyl propacrylate, n-butyl acrylate, phenyl methacrylate, and the like; precursors of such unsaturated aliphatic carboxylic acids including nitriles and amides, such as acrylonitrile, methacrylonitrile, methacrylamide, and the like; ethers such as methyl vinyl ether; ketones such as methyl isopropenyl ketone, methyl vinyl ketone, and the like.

Catalysts (or reaction initiators) which can be used in the polymerization of the olefins described herein are well known to those skilled in the art. The use of organolithium compounds as catalysts has been previously mentioned. Other catalyst systems which can be used in polymerizing the above-named conjugated dienes include those which contain as an essential ingredient a compound selected from the group consisting of metals, organometals, and metal hydrides, the metal being of Groups I, II, or III of the periodic table. For example, hydrides or organo compounds of aluminum, gallium, indium, thallium, and beryllium can be used, alone or together with a di-, tri-, or tetra-halide of a Group IV metal such as titanium, zirconium, thorium, silicon, tin, lead, hafnium, germanium or cerium. Mixtures of titanium tetraiodide (or titanium tetrachloride) and triethylaluminum, a mixture of titanium tetrachloride (or tetraiodide) and tripropylaluminum, a mixture of titanium tetrachloride (or tetraiodide) and triisobutylaluminum, and a mixture of zirconium tetrachloride (or tetraiodide) and triethylaluminum, can be used. A third component can be added to these mixtures if desired, such as iodine or ethylaluminum dichloride or diethylaluminum chloride. Specific examples includes triethylaluminum, titanium tetrachloride and titanium tetraiodide; tributylaluminum, titanium tetrachloride, and iodide; titanium trichloride and diethylaluminum chloride.

While hexane has been utilized as the solvent in the description of the drawing it is within the contemplation of the invention to utilize any suitable solvent. Particularly useful solvents or diluents are those of the group consisting of aromatic, paraffinic, and cycloparaffinic hydrocarbons. The preferred hydrocarbons of these types are those containing from 4 to 12 inclusive, carbon atoms. Examples of suitable hydrocarbons which can be used include isobutane, n-pentane, isooctane, n-dodecane, cyclopentane, cyclohexane, ethylcyclopentane, dimethylcyclopentane, methylcyclohexane, benzene, toluene, xylene, ethylbenzene, naphthalene, and the like. Mixtures of these various materials can also be employed.

As previously mentioned the invention is not limited to polymerization processes, but is generally applicable to any exothermic process involving the utilizing of a catalyst wherein the feed materials to the reaction contain a varying amount of catalyst poisons. Thus the invention is broadly applicable to processes such as alkylation, hydrogenation, and polymerization. Accordingly, it is readily obvious that the particular catalyst utilized will vary with the process and other design factors. Similarly the use of a solvent and the nature of the solvent will depend upon the particular process and the operation conditions. In the same manner, the particular titrating material utilized can vary. Thus the titrating material can be any one or a mixture of any two or more of the materials mentioned herein as well as other suitable catalytic materials known in the art. Again, the titrating material is preferably the same as the primary catalyst.

Reasonable variation and modification are possible within the scope of the disclosure, the drawings and the appended claims to the invention.

I claim:
1. A method for the introduction into an exothermic catalytic reaction zone of the amount of catalyst necessary to obtain desired properties of a product of the reaction comprising passing a feed stream into said reaction zone, intermittently and repetitively withdrawing a sample from said feed stream, passing the thus withdrawn sample into an analyzing zone, introducing into said sample in said analyzing zone material which reacts with catalyst poisons contained in said sample and causes commencement of the exothermic reaction upon the substantial completion of the reaction of the catalyst poisons in said sample with said material, detecting the sharp rise in temperature of the sample which signifies the substantially complete reaction of the catalyst poisons contained therein and the commencement of the exothermic reaction, establishing a control signal responsive to the amount of said material added to said sample prior to the detection of said sharp rise in temperature, and introducing catalyst into said reaction zone at a rate responsive to said control signal.

2. A method in accordance with claim 1 wherein said material is an organolithium compound of the formula $R(Li)_x$, where R is a hydrocarbon radical selected from the group consisting of aliphatic, cycloaliphatic, and aromatic radicals and contains from 1 to 20, inclusive, carbon atoms, and $x$ is an integer from 1 to 4, inclusive.

3. A method in accordance with claim 1 wherein said material is the same as said catalyst.

4. A method in accordance with claim 1 wherein said exothermic reaction is a polymerization reaction.

5. A method in accordance with claim 1 wherein said step of introducing catalyst into said reaction zone at a rate responsive to said control signal comprises passing a first stream of catalyst into said reaction zone at the rate required to produce the desired properties of the reaction product on the assumption of no catalyst poisons in said feed stream and passing a second stream of catalyst into said reaction zone at a rate responsive to said control signal.

6. A method for the introduction into an exothermic catalytic reaction zone of the amount of catalyst necessary to obtain desired properties of a product of the reaction comprising, passing a feed stream into said reaction zone, intermittently and repetitively withdrawing a sample from said feed stream, passing the thus withdrawn sample into an analyzing zone, introducing into said sample in said analyzing zone material which reacts with catalyst poisons contained in said sample and causes commencement of the exothermic reaction upon the substantial completion of the reaction of the catalyst poisons in said sample with said material, producing a first signal representative of the temperature of the sample in said analyzing zone, producing a second signal representative of the rate of change of said first signal, producing a third signal representative of the amount of said material introduced into said sample prior to the time said second signal exceeds a predetermined value, said predetermined value being indicative of the occurrence of the substantially complete reaction of the catalyst poisons contained in the sample and the commencement of the exothermic reaction, continuously producing a fourth signal the amplitude of which is representative of the last occurring third signal, and introducing catalyst into said reaction zone at a rate responsive to said fourth signal.

7. A method for the introduction into an exothermic catalytic reaction zone of the amount of catalyst necessary to obtain desired properties of a product of the reaction comprising passing a feed stream into said reaction zone, withdrawing a sample from said feed stream, passing the thus withdrawn sample into an analyzing zone, introducing into said sample in said analyzing zone material which reacts with catalyst poisons contained in said sample and causes commencement of the exothermic reaction upon the substantial completion of the reaction of the catalyst poisons in said sample with said material, detecting the sharp rise in temperature of the sample which signifies the substantially complete reaction of the catalyst poisons contained therein and the commencement of the exothermic reaction, and introducing catalyst into said reaction zone at a rate responsive to the amount of said material added to said sample prior to the detection of said sharp rise in temperature.

8. Apparatus for the introduction into an exothermic catalytic reactor of the amount of catalyst necessary to obtain desired properties of a product of the reaction comprising a reactor, means for passing a feed stream into said reactor, an analyzer, means for intermittently and repetitively withdrawing a sample from said feed stream and passing the thus withdrawn sample into said analyzer, means for introducing into said sample in said analyzer material which reacts with catalyst poisons contained in said sample and causes commencement of the exothermic reaction upon the substantial completion of the reaction of the catalyst poisons in said sample with said material, said analyzer having means for detecting the sharp rise in temperature of the sample which signifies the substantially complete reaction of the catalyst poisons contained therein and the commencement of the exothermic reaction and establishing a control signal responsive to the amount of said material added to said sample prior to the detection of said sharp rise in temperature, and means for introducing catalyst into said reactor at a rate responsive to said control signal.

9. Apparatus in accordance with claim 8 wherein said means for introducing catalyst into said reactor at a rate responsive to said control signal comprises means for passing a first stream of catalyst into said reactor at the rate required to produce the desired properties of the reaction product on the assumption of no catalyst poisons in said feed stream and means for passing a second stream of catalyst into said reactor at a rate responsive to said control signal.

10. Apparatus for the introduction into an exothermic catalytic reactor of the amount of catalyst necessary to obtain desired properties of a product of the reaction comprising a reactor, means for passing a feed stream into said reactor, an analyzer, means for intermittently and repetitively withdrawing a sample from said feed stream and passing the thus withdrawn sample into said analyzer, means for introducing into said sample in said analyzer material which reacts with catalyst poisons contained in said sample and causes commencement of the exothermic reaction upon the substantial completion of the reaction of the catalyst poisons in said sample with said material, means for producing a first signal representative of the temperature of the sample in said analyzer, means for producing a second signal representative of the rate of change of said first signal, means for producing a third signal representative of the amount of said material introduced into said sample prior to the time said second signal exceeds a predetermined value, said predetermined value being indicative of the occurrence of the substantially complete reaction of the catalyst poisons contained in the sample and the commencement of the exothermic reaction, means for continuously producing a fourth signal the amplitude of which is representative of the last occurring third signal, and means for introducing catalyst into said reactor at a rate responsive to said fourth signal.

References Cited by the Examiner
UNITED STATES PATENTS

| | | |
|---|---|---|
| 2,886,616 | 5/1959 | Mertz et al. |
| 2,977,199 | 3/1961 | Quittner _____ 23—230 |
| 3,140,278 | 7/1964 | Kuntz _____ 260—94.2 |

FOREIGN PATENTS

| | | |
|---|---|---|
| 876,031 | 8/1961 | Great Britain. |

MORRIS O. WOLK, *Primary Examiner.*

H. A. BIRENBAUM, *Assistant Examiner.*